(12) United States Patent
Takagi et al.

(10) Patent No.: US 12,546,613 B2
(45) Date of Patent: Feb. 10, 2026

(54) INFORMATION PROCESSING DEVICE AND INFORMATION PROCESSING METHOD

(71) Applicants: Nissan Motor Co., Ltd., Kanagawa (JP); RENAULT S.A.S., Boulogne-Billancourt (FR)

(72) Inventors: Yoshitaka Takagi, Kanagawa (JP); Masahide Nakamura, Kanagawa (JP)

(73) Assignees: Nissan Motor Co., Ltd., Kanagawa (JP); Renault S.A.S., Boulogne-Billancourt (FR)

( * ) Notice: Subject to any disclaimer, the term of this patent is extended or adjusted under 35 U.S.C. 154(b) by 206 days.

(21) Appl. No.: 18/282,142

(22) PCT Filed: Mar. 17, 2021

(86) PCT No.: PCT/IB2021/000183
§ 371 (c)(1),
(2) Date: Sep. 14, 2023

(87) PCT Pub. No.: WO2022/195313
PCT Pub. Date: Sep. 22, 2022

(65) Prior Publication Data
US 2024/0295405 A1 Sep. 5, 2024

(51) Int. Cl.
*G01C 21/34* (2006.01)
*G06Q 50/47* (2024.01)
*H04W 4/024* (2018.01)

(52) U.S. Cl.
CPC ......... *G01C 21/3438* (2013.01); *G06Q 50/47* (2024.01); *H04W 4/024* (2018.02)

(58) Field of Classification Search
CPC .... G01C 21/3438; G06Q 50/47; G06Q 50/40; H04W 4/024; G08G 1/00; G08G 1/005; G08G 1/0968
See application file for complete search history.

(56) References Cited

U.S. PATENT DOCUMENTS

| | | |
|---|---|---|
| 10,134,286 B1 | 11/2018 | Elswick et al. |
| 10,685,571 B2 | 6/2020 | Watanabe |
| 10,885,791 B2 | 1/2021 | Watanabe |
| 2019/0108757 A1 | 4/2019 | Watanabe |

(Continued)

FOREIGN PATENT DOCUMENTS

| | | |
|---|---|---|
| CN | 109558957 A | 4/2019 |
| DE | 102018123632 A1 | 3/2019 |

(Continued)

*Primary Examiner* — Brandon D Lee
(74) *Attorney, Agent, or Firm* — Osha Bergman Watanabe & Burton LLP (57) ABSTRACT

An information processing device and an information processing method determine a vehicle to be allocated to a user based on a vehicle allocation request from an information terminal operated by a user, calculate an accuracy of a position of the information terminal based on a position data indicating the position of an information terminal, extract a waiting point that is a candidate for a point where the user and the vehicle meet, based on the position data, and transmit the waiting point to the information terminal. Here, a number of waiting points extracted when the accuracy is low is greater than a number of waiting points extracted when the accuracy is high.

9 Claims, 3 Drawing Sheets

(56) References Cited

U.S. PATENT DOCUMENTS

| | | | |
|---|---|---|---|
| 2020/0041301 A1* | 2/2020 | Jalasutram | H04W 4/029 |
| 2020/0226932 A1 | 7/2020 | Watanabe | |
| 2020/0257317 A1* | 8/2020 | Musk | G05D 1/686 |

FOREIGN PATENT DOCUMENTS

| | | |
|---|---|---|
| JP | 2016-091411 A | 5/2016 |
| JP | 2018-163578 A | 10/2018 |
| JP | 2019-070971 A | 5/2019 |

* cited by examiner

INFORMATION PROCESSING DEVICE AND INFORMATION PROCESSING METHOD

TECHNICAL FIELD

The present invention relates to an information processing device and an information processing method.

BACKGROUND ART

A technology related to a system is disclosed, the system acquires information representing the current location of a user and information representing the current location and usage status of a vehicle when allocating the vehicle to the user, and sets a scheduled vehicle that can be allocated to the user and a boarding place based on these information (Patent Literature 1).

CITATION LIST

Patent Literature

Patent Literature 1: Japanese Patent Laid-Open Publication No. 2016-91411

SUMMARY OF INVENTION

Technical Problem

According to the technology described in Patent Literature 1, from among a plurality of boarding place candidates, a place that the user can reach most easily from the user's current location (for example, a place with the shortest required time or required distance) is set as the boarding place. Therefore, when the accuracy of the user's position is low, there is a problem that a place that the user cannot easily reach may be set as the boarding place.

The present invention has been made in view of the above problems, and an object of the present invention is to provide an information processing device and an information processing method capable of setting a place that the user can easily reach as a waiting point where the user and the vehicle to be allocated meet, even when the accuracy of the user's position is low.

Solution to Problem

In order to solve the above-described problems, an information processing device and an information processing method, according to an aspect of the present invention, determine a vehicle to be allocated to a user based on a vehicle allocation request from an information terminal operated by a user, calculate an accuracy of a position of the information terminal based on a position data indicating the position of an information terminal, extract a waiting point that is a candidate for a point where the user and the vehicle meet, based on the position data, and transmit the waiting point to the information terminal. Here, a number of waiting points extracted when the accuracy is low is greater than a number of waiting points extracted when the accuracy is high.

Advantageous Effects of Invention

According to the present invention, even when the accuracy of the user's position is low, it is possible to set a place that the user can easily reach as a waiting point where the user and the vehicle to be allocated meet.

DESCRIPTION OF EMBODIMENTS

Hereinafter, embodiments of the present invention will be described with reference to the drawings. In the description of the drawings, the same items are designated by the same reference numerals and duplicate description will be omitted.

[Configuration of Information Processing System]

Figure 1:
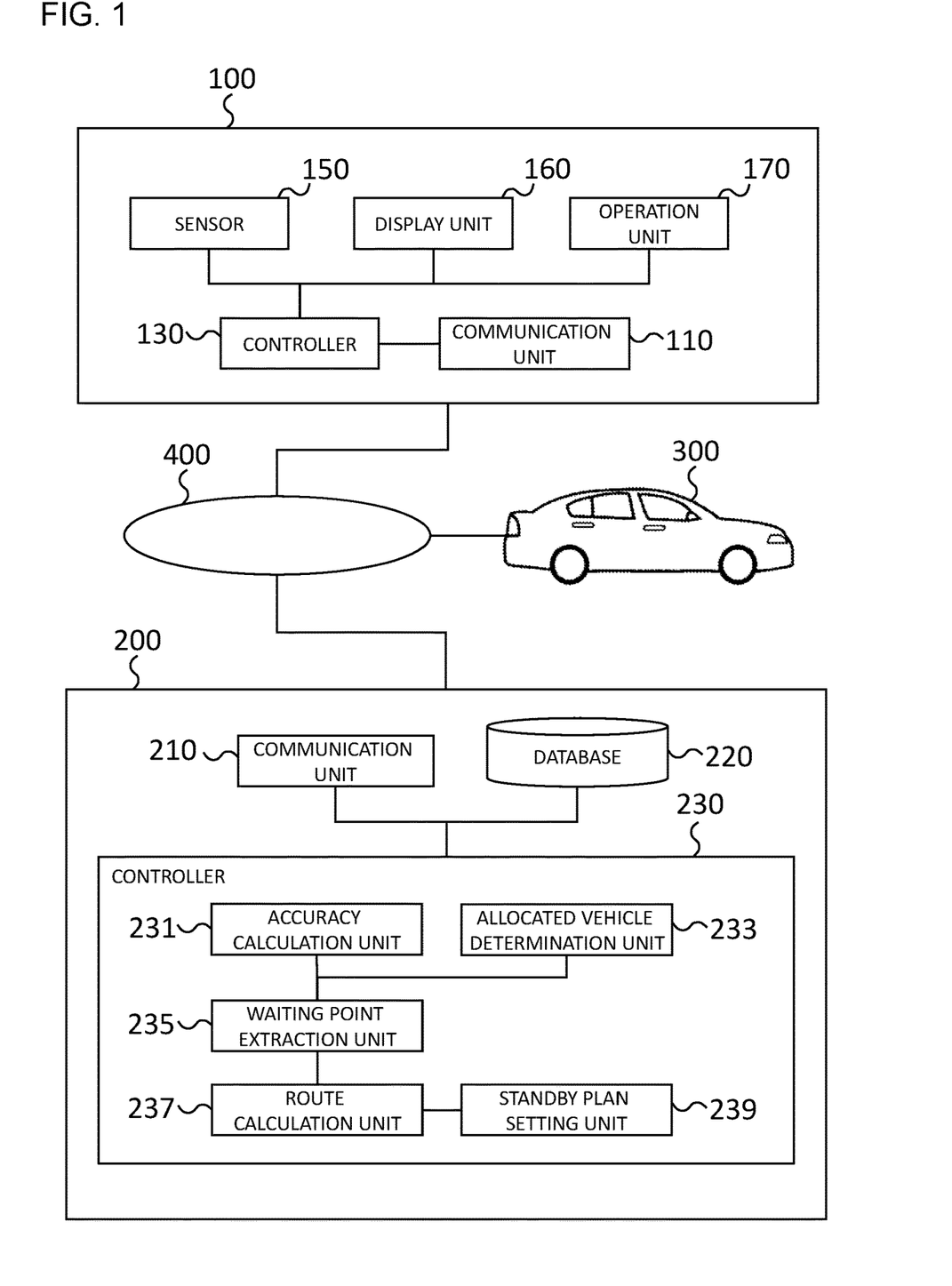
FIG. 1 is a block diagram illustrating a configuration of an information processing system according to an embodiment of the present invention.

FIG. 1 is a block diagram illustrating a configuration of an information processing system according to an embodiment of the present invention. As shown in FIG. 1, the information processing system includes a terminal 100 (information terminal), a server 200, and a vehicle 300, which are connected to each other via a wireless or wired network 400.

The network 400 is, for example, the Internet. The network 400 may utilize mobile communication capabilities such as 4G/LTE and 5G.

The terminal 100 receives a user's operation and transmits information regarding the received operation to the network 400. The terminal 100 may transmit a vehicle allocation request to the network 400 based on the user's operation. For example, a portable terminal (smartphone, tablet, etc.) used by a user daily can be used as the terminal 100.

The vehicle 300 is a vehicle that provides means of transportation to the destination specified in the transportation request, such as an automatic driving vehicle. Other examples of the vehicle 300 include various means of transport such as manned/unmanned taxis, buses, and trucks. A plurality of vehicles may be registered in the information processing system.

The vehicle 300 may transmit vehicle information of the vehicle 300 at a predetermined timing or at a predetermined cycle or may transmit vehicle information of the vehicle 300 based on commands from the terminal 100 or the server 200.

The server 200 generates information relating to the meeting of the user and the vehicle to be allocated to the user. The server 200 may be installed in an external server (not shown) that provides a vehicle allocation service or may be installed in the terminal 100 or the vehicle 300.

In the following, it is assumed that terminal 100, server 200, and vehicle 300 are capable of bi-directional communication via network 400.

[Configuration of Terminal]

Next, the terminal 100 (information terminal) will be described. As shown in FIG. 1, the terminal 100 includes a sensor 150, a display unit 160, an operation unit 170, a communication unit 110, and a controller 130.

The sensor 150 is composed of a plurality of sensor groups and includes a position detection sensor that acquires the position data indicating the position of terminal 100. For example, the position detection sensor is a sensor that measures an absolute position, such as GPS (Global Positioning System). In addition, the position detection sensor may be a sensor that measures an absolute position by a method such as Wi-Fi (registered trademark) positioning, RFID (Radio Frequency Identifier) positioning, beacon positioning, or the like.

Note that the position data may include error data indicating positional error of terminal 100. Here, "error" means the magnitude of the difference between the position of terminal 100 specified by position data and the actual position of terminal 100.

For example, if the position detection sensor is a sensor that measures the absolute position by GPS, the positional error of the terminal 100 can be calculated based on a reception status of GPS radio waves. The sensor 150 may calculate the error data based on the reception status of GPS radio waves (DOP value (Dilution of Precision), number of supplementary satellites, etc.).

Similarly, for Wi-Fi (registered trademark) positioning, RFID (Radio Frequency Identifier) positioning, beacon positioning, etc., the positional error of the terminal 100 can be calculated based on a reference signal strength, the number of signals, etc. The sensor 150 may calculate the error data based on the reference signal strength, the number of signals, and the like.

In addition, the position data may include, as supplementary data, data such as the reception status of GPS radio waves, the reference signal strength, the number of signals, and the like, used for outputting the error data.

The display unit 160 displays information about the waiting point with the vehicle 300. Further, the display unit 160 may display guidance information for guiding the movement of the user to the waiting point. In addition, the display unit 160 may display information on the vehicle 300 and information on the travel route of the vehicle 300. Information of movement route and the guidance information for guiding the movement of the user may be acquired from the server 200 via the network 400 by the communication unit 110, which will be described later.

Note that the display unit 160 is not limited to presenting several types of information by visual information. The display unit 160 may present information to the user using auditory information or may present information to the user by generating vibration and stimulating the user with the vibration.

The operation unit 170 receives user operations corresponding to various commands from the user to the information processing system. For example, the operation unit 170 may be an input interface with a plurality of buttons, or a touch panel with a touch interface.

More specifically, the display unit 160 may display icons represented by pictures or symbols so that the user can operate them, and the operation unit 170 may receive user operations by touching or dragging the displayed icons.

The communication unit 110 transmits and receives information to and from network 400. The communication unit 110 stores information acquired from the network 400 in a memory (not shown) or the like, and outputs predetermined information such as the vehicle allocation request generated based on user's operation and position data to the network 400. For example, the communication unit 110 may be a device with a mobile communication function such as 4G/LTE or 5G, or a device with a Wi-Fi communication function.

The controller 130 is connected to the sensor 150, the display unit 160, the operation unit 170, and the communication unit 110. Information is input to the controller 130 from the sensor 150, the operation unit 170, and the communication unit 110. Information is output to the display unit 160 and the communication unit 110 from the controller 130.

Note that the controller 130 is a general-purpose microcomputer having a CPU (Central Processing Unit), a memory, and an input/output unit. A computer program (information terminal program) for functioning as part of the information processing system is installed in the controller 130. By executing a computer program, the controller 130 controls display unit 160 and communication unit 110.

Various information processing provided by the controller 130 may be realized by software or may be realized by dedicated hardware.

The controller 130 generates a request to an external server that provides a vehicle allocation service or request to an information processing system based on a user's operation on operation unit 170. For example, the request may include a specification of the destination to which the vehicle 300 is headed and the estimated time of arrival at the destination. The request may also include a specification of the scheduled departure time at which the vehicle 300 departs.

[Configuration of Server]

Next, the server 200 (information processing device) will be described. As shown in FIG. 1, the server 200 includes a communication unit 210 (communication means), a database 220 and a controller 230.

The communication unit 210 transmits and receives information to and from network 400. The communication unit 210 acquires predetermined information from the network 400, such as the vehicle allocation request and the position data transmitted from the terminal 100 and vehicle information transmitted from the vehicle 300 and records the acquired information in the database 220.

The database 220 stores information acquired by the communication unit 210. In addition, the database 220 may store points where the vehicle can stop and past position data of the user.

The controller 230 is a general-purpose microcomputer having a CPU (Central Processing Unit), memory, and an input/output unit. A computer program (information processing server program) for functioning as part of the information processing system is installed in the controller 230. By executing the computer program, the controller 230 functions as a plurality of information processing circuits (231, 233, 235, 237, 239).

Here, an example is shown in which the plurality of information processing circuits (231, 233, 235, 237, 239) included in the controller 230 are realized by software. However, it is also possible to configure the information processing circuits (231, 233, 235, 237, 239) by preparing dedicated hardware for executing each of the following information processing. Further, the plurality of information processing circuits (231, 233, 235, 237, 239) may be configured by individual hardware.

The controller 230 includes an accuracy calculation unit 231, an allocated vehicle determination unit 233, a waiting point extraction unit 235, a route calculation unit 237, and a standby plan setting unit 239 as a plurality of information processing circuits (231, 233, 235, 237, 239).

The accuracy calculation unit 231 calculates the accuracy of the position of terminal 100 based on the position data transmitted from terminal 100. Specifically, the accuracy of the position of terminal 100 is calculated based on the error data or the supplementary data included in the position data. Here, "high accuracy" means that the positional error of the terminal 100 is small. Conversely, "low accuracy" means that the positional error of the terminal 100 is large.

For example, the accuracy calculation unit 231 may calculate the accuracy of the position of the terminal 100 higher as the smaller the error indicated by the error data.

Further, the accuracy calculation unit 231 may refer to the reception status of GPS radio waves obtained as the supplementary data and may calculate the accuracy of the position of the terminal 100 higher as the smaller the DOP value or the larger the number of supplementary satellites.

Further, the accuracy calculation unit 231 may calculate the accuracy of the position of the terminal 100 higher as the higher the reference signal strength or the greater the number of signals.

In addition, the accuracy calculation unit 231 may calculate the accuracy of the position of the terminal 100 lower when the reception status of radio waves used to determine the position of the terminal 100 is poor. Conversely, the accuracy calculation unit 231 may calculate the accuracy of the position of the terminal 100 higher when the reception status of radio waves used to determine the position of the terminal 100 is good.

In addition, when the user does not stay in one place and frequently moves with the terminal 100, it is assumed that there may be a large variation (dispersion) in the plurality of positions indicated by the plurality of position data acquired within a predetermined period.

In this way, in order to treat the case that the user moves frequently as a case of low accuracy, the accuracy calculation unit 231 may calculate the accuracy of the position of the terminal 100 as lower as the variation increases in the plurality of positions indicated by the plurality of position data obtained within the predetermined period of time. The predetermined period and the timing of acquiring the position data are arbitrarily determined.

The allocated vehicle determination unit 233 determines a vehicle to be allocated to the user from among the plurality of vehicles 300 based on the vehicle allocation request transmitted from the terminal 100. Known methods can be used to determine the vehicle to be allocated based on the vehicle allocation request. In addition, the allocated vehicle determination unit 233 may acquire information of a vehicle allocated to the user from an external server (not shown) that provides the vehicle allocation service.

The waiting point extraction unit 235 extracts a waiting point, which is a candidate for a point where the user and the vehicle allocated to the user meet, based on the position data. The number of waiting points extracted by the waiting point extraction unit 235 when the accuracy is low is greater than the number of waiting points extracted when the accuracy is high.

Specifically, the waiting point extraction unit 235 sets an area for extracting the waiting point based on the position data transmitted from the terminal 100. Here, a range within a predetermined distance from the position of the terminal 100 indicated by the position data, or a range within which the user can move within a predetermined period is set as the area for extracting waiting points. Then, from the points registered in advance in the database 220 where the vehicle can stop, points included in the area are extracted as waiting points.

Regarding the predetermined distance and the predetermined period used to set the area, the predetermined distance may be determined by the distance that the user can move, and the predetermined period may be determined by the time that the user can move.

Here, the position of the terminal 100 indicated by the position data may fluctuate by the positional error of the terminal 100 due to the position measurement by the position acquisition sensor. Therefore, a wider area is set when the accuracy is low compared to the area set when the accuracy is high. For example, when the accuracy is low, the predetermined distance or the predetermined period may be set larger than the predetermined distance or the predetermined period determined when the accuracy is high.

In addition, when the user does not stay in one place and frequently moves with the terminal 100, it is assumed that there may be a large variation (dispersion) in the plurality of positions indicated by the plurality of position data acquired within a predetermined period. To extract an appropriate waiting point when the user moves frequently, the waiting point extraction unit 235 may set the area for extracting waiting points such that the area includes a plurality of positions indicated by a plurality of position data acquired within the predetermined period.

The waiting point extraction unit 235 may determine whether the accuracy calculated by the accuracy calculation unit 231 has been updated and may reduce the area for extracting waiting points in a case the accuracy after update is higher than the accuracy before update.

In addition, when the accuracy calculated by the accuracy calculation unit 231 is lower than a predetermined threshold value, that is, when the positional error of the terminal 100 is larger than a predetermined size, the waiting point extraction unit 235 may generate an input request for the user to request input of the position data. The generated input request is transmitted to terminal 100 via communication unit 210.

The position data input by the user to the terminal 100 in response to the input request is transmitted to the server 200 via the communication unit 110 and presented to the user. The waiting point extraction unit 235 may set the area for extracting the waiting point based on a position indicated by the position data input by the user.

In addition, when the accuracy calculated by the accuracy calculation unit 231 is sufficiently high, that is, when the positional error of the terminal 100 is sufficiently small, the waiting point extraction unit 235 may extract a waiting point that the user can reach most easily from the position of the terminal 100. Here, the case where the calculated accuracy is sufficiently high means, for example, the case where the accuracy is higher than a predetermined threshold. The waiting point that the user can reach most easily means, for example, the waiting point that requires the shortest time or distance to travel from the user's position to the waiting point.

The waiting point extraction unit 235 may generate a selection request requesting the user to select one waiting point from among the plurality of waiting points when there is a plurality of extracted waiting points. The generated selection request is transmitted to the terminal 100 via the communication unit 210 and presented to the user. The waiting point selected by the user in response to the selection request is transmitted to the server 200 via the communication unit 110.

The waiting point extraction unit 235 may generate a message indicating that multiple waiting points have been extracted due to low accuracy of the position of the terminal 100 when there are multiple waiting points extracted. The generated message is transmitted to the terminal 100 via the communication unit 210 and presented to the user. As a result, it can be expected that the user will move to a place where the position of the terminal 100 is highly accurate (for example, a place where the reception status of the radio wave used to determine the position of the terminal 100 is good) according to the message.

The route calculation unit 237 calculates a route for traveling from the position of the allocated vehicle to the waiting point for each waiting point extracted by the waiting point extraction unit 235. For example, the route calculation unit 237 calculates a route based on map information or the like. Known methods can be used as a method of calculating the route.

When the accuracy calculated by the accuracy calculation unit 231 is lower than a predetermined threshold value, the route calculation unit 237 may calculate a branch point where the calculated routes diverge from each other and may set the branch point as the destination of the vehicle.

Calculation of the branch point will be described in detail. The route calculated for each waiting point by the route calculation unit 237 starts at the position of the allocated vehicle and ends at the waiting point. Therefore, when a plurality of different waiting points is extracted by the accuracy calculation unit 231, the plurality of routes calculated by the route calculation unit 237 have a common start point and a plurality of different end points.

Therefore, the plurality of routes calculated by the route calculation unit 237 have a common portion with the position of the allocated vehicle as one end. The route calculation unit 237 extracts a common portion whose one end is the position of the allocated vehicle from among the calculated routes and calculates the other end of the common portion as the branch point.

From the definition of the branch point, the plurality of routes calculated by the route calculation unit 237 differ in the portion from the branch point to the waiting point.

Setting the branch point to the vehicle's destination will be described in detail. The number of waiting points extracted when the accuracy of the user's position is low (for example, when the user is located underground where communication condition is poor) is bigger than the number of waiting points extracted when the accuracy of the user's position is high (for example, when the user is located on the ground where communication condition is good). Therefore, when the accuracy of the user's position is low, the number of waiting points to which vehicles allocated to users should go cannot be narrowed down.

Therefore, it is desirable that the vehicle is on standby until the accuracy of the user's position changes from low to high and the number of waiting points can be narrowed down. On the other hand, if the vehicle allocated to the user cannot start traveling until the number of waiting points can be narrowed down, the arrival of the vehicle at the waiting point to meet the user may be delayed.

By setting the branch point as the destination of the vehicle, the route calculation unit 237 allows the vehicle to travel to the branch point and move to the surrounding area of the user. As a result, it is possible to reduce the possibility that the vehicle will arrive late at the waiting point where the user is to meet.

As a result of updating the accuracy calculated by the accuracy calculation unit 231, at the timing when the number of waiting points extracted by the waiting point extraction unit 235 decreases, the route calculation unit 237 may update the branch point and may reset the branch point after the update as a destination.

When the waiting point extracted by the waiting point extraction unit 235 is determined to be one, the route calculation unit 237 sets the waiting point as the destination.

The route calculation unit 237 may calculate the arrival time of the vehicle at the calculated branch point and the arrival time of the vehicle at each waiting point based on the calculated route. The arrival time of the vehicle at the branch point and the arrival time of the vehicle at each waiting point are transmitted to the terminal 100 via the communication unit 210 and presented to the user.

After the route calculation unit 237 sets the destination (branch point or waiting point), the standby plan setting unit 239 determines whether the vehicle needs to be on standby until the vehicle reaches the destination. Then, when it is determined that the vehicle needs to be on standby, the standby plan setting unit 239 generates a travel plan (standby plan) for causing the vehicle to be on standby.

More specifically, the standby plan setting unit 239 determines that the vehicle needs to be on standby when there is a plurality of waiting points extracted by the waiting point extraction unit 235. On the other hand, if there is only one waiting point extracted by the waiting point extraction unit 235, the standby plan setting unit 239 determines that the vehicle does not need to be on standby.

The standby plan setting unit 239 may determine that the vehicle needs to be on standby when the accuracy calculated by the accuracy calculation unit 231 is less than the predetermined threshold. In addition, the standby plan setting unit 239 may calculate the arrival time at which the user arrives at the waiting point based on the position information of the terminal 100 and may determine that the vehicle needs to be on standby when the arrival time at which the user arrives at the waiting point is later than the arrival time at which the vehicle arrives at the waiting point.

The standby plan setting unit 239 extracts a standby point located around the destination (branch point or waiting point) and generates a standby plan for temporarily stopping the vehicle at the standby point.

For example, the standby plan setting unit 239 may extract, as the standby point, a point located within a predetermined distance from the destination from among the points at which the vehicle can stop registered in the database 220 in advance. The standby point may be on the route calculated by the route calculation unit 237 or may be a point away from the route. The standby plan setting unit 239 may correct the route calculated by the route calculation unit 237 to calculate a route from the position of the allocated vehicle to the destination via the standby point.

In addition, instead of generating the standby plan to temporarily stop the vehicle at the standby point, the standby plan setting unit 239 may calculate an excursion route for returning to the destination after passing through the destination (passing through the destination without stopping), and may generate a standby plan for repeatedly driving the vehicle on the excursion route. The excursion route may be a route included in a range within a predetermined distance from the destination.

The calculated standby point and the route passing through the standby point, or the calculated excursion route may be transmitted to the allocated vehicle via the communication unit 210, and the vehicle may by controlled to travel along the route passing through the standby point or the excursion route. The calculated standby point and the route passing through the standby point, or the calculated excursion route may be transmitted to the terminal 100 via the communication unit 210 and may be presented to the user.

[Processing Procedure of Information Processing System]

Figure 2:
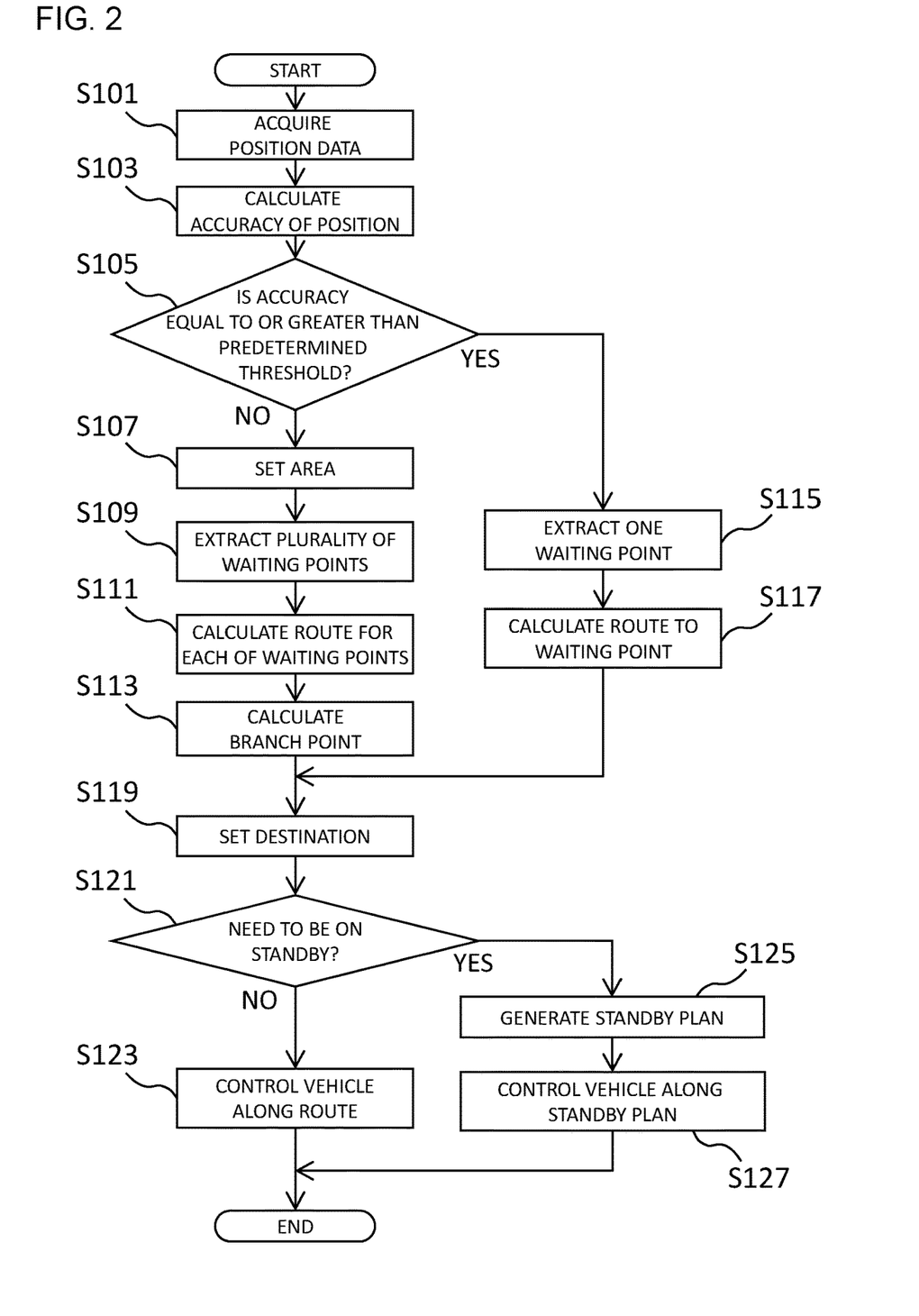
FIG. 2 is a flowchart illustrating a processing of the information processing system according to the embodiment of the present invention.
Figure 3:
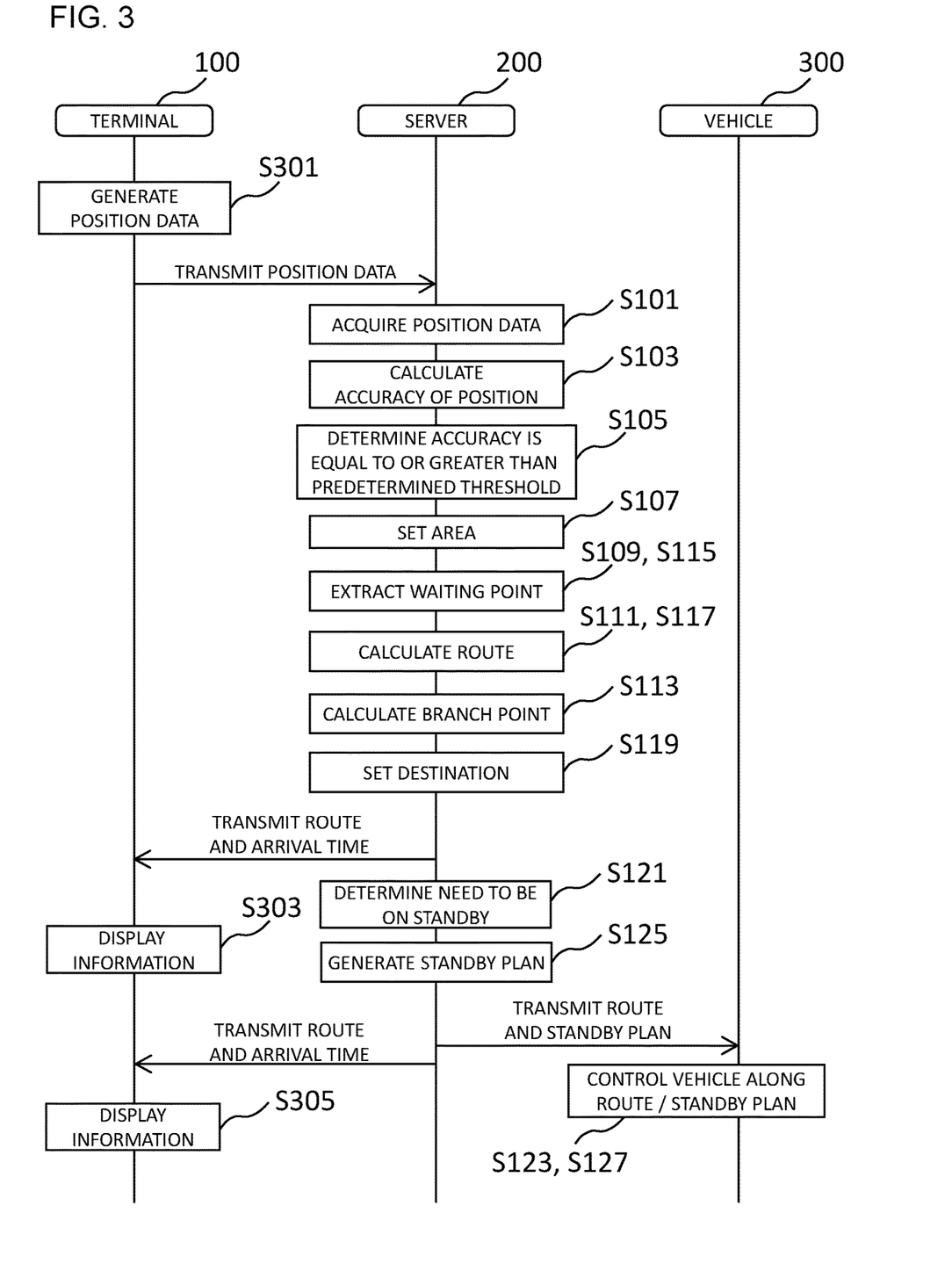
FIG. 3 is a sequence chart illustrating an operation example of the information processing system according to the embodiment of the present invention.

Next, the processing procedure of the information processing system according to the present embodiment will be described with reference to FIGS. 2 and 3. FIG. 2 is a flowchart illustrating a processing of the information processing system according to the embodiment of the present invention. FIG. 3 is a sequence chart illustrating an operation example of the information processing system according to the embodiment of the present invention.

The processing of the flowchart shown in FIG. 2 is started after the vehicle to be allocated to the user is determined based on the vehicle allocation request and is repeatedly executed at a predetermined cycle until the vehicle stops at the waiting point.

As shown in FIG. 3, in step S301, the terminal 100 generates position data and transmits the position data from the terminal 100 to the server 200. Then, in step S101, the accuracy calculation unit 231 acquires the position data indicating the position of the terminal 100.

In step S103, the accuracy calculation unit 231 calculates the accuracy of the position of the terminal 100 based on the position data.

In step S105, the waiting point extraction unit 235 determines whether the accuracy calculated by the accuracy calculation unit 231 is equal to or greater than a predetermined threshold.

When it is determined that the accuracy is not equal to or greater than the predetermined threshold (NO in step S105), in step S107, the waiting point extraction unit 235 sets an area for extracting the waiting point based on the position data transmitted from the terminal 100.

After that, in step S109, the waiting point extraction unit 235 extracts, as waiting points, a plurality of points included in the area from the points where the vehicle can stop. Then, in step S111, the route calculation unit 237 calculates a route for traveling from the position of the allocated vehicle to the waiting point for each of the extracted waiting points.

In step S113, the waiting point extraction unit 235 calculates a branch point at which the calculated routes diverge from each other.

On the other hand, if it is determined that the accuracy is equal to or greater than the predetermined threshold (YES in step S105), in step S115, the waiting point extraction unit 235 extracts the waiting point that the user can most easily reach from the position of the terminal 100 (For example, the waiting point with the shortest required time or required distance). Then, in step S117, the route calculation unit 237 calculates a route to the extracted waiting point.

In step S119, the waiting point extraction unit 235 sets the destination of the vehicle. In particular, the waiting point extraction unit 235 sets the branch point as the destination of the vehicle when the branch point is calculated and sets the waiting point as the destination of the vehicle when the branch point is not calculated.

As shown in FIG. 3, the extracted waiting point, the calculated route, and the arrival time at which the vehicle arrives at the destination may be transmitted from the server 200 to the terminal 100. The information transmitted from the server 200 to the terminal 100 (the extracted waiting point, the calculated route, the arrival time at which the vehicle arrives at the destination) may be displayed on the display unit 160 of the terminal 100 in step S303 and may be notified to the user.

In step S121, the standby plan setting unit 239 determines whether the vehicle needs to be on standby until the vehicle reaches the destination.

When it is determined that the vehicle does not need to be on standby (NO in step S121), in step S123, the standby plan setting unit 239 transmits the route calculated by the route calculation unit 237 to the allocated vehicle, and the vehicle is controlled along the transmitted route.

On the other hand, when it is determined that the vehicle needs to be on standby (YES in step S121), the standby plan setting unit 239 generates a standby plan in step S125.

After that, in step S127, the standby plan setting unit 239 transmits the standby plan to the allocated vehicle, and the vehicle is controlled according to the transmitted standby plan.

Note that, as shown in FIG. 3, the calculated route and the standby plan are transmitted from the server 200 to the vehicle 300 to be allocated.

The extracted waiting point, the calculated route, the standby plan, and the arrival time at which the vehicle arrives at the destination may be transmitted from the server 200 to the terminal 100. Then, the information transmitted from the server 200 to the terminal 100 (the extracted waiting point, the calculated route, the standby plan, the arrival time at which the vehicle arrives at the destination) may be displayed on the display unit 160 of the terminal 100 in step S305, and may be notified to the user.

Effects of the Embodiments

As explained in detail above, an information processing device and an information processing method, according to the present embodiment, determine a vehicle to be allocated to a user based on a vehicle allocation request from an information terminal operated by a user, calculate an accuracy of a position of the information terminal based on a position data indicating the position of an information terminal, extract a waiting point that is a candidate for a point where the user and the vehicle meet, based on the position data, and transmit the waiting point to the information terminal. Here, a number of waiting points extracted when the accuracy is low is greater than a number of waiting points extracted when the accuracy is high.

As a result, even if the accuracy of the user's position is low, it is possible to set a place that the user can easily reach as the waiting point where the user and the allocated vehicle meet. In particular, when the accuracy is low, the number of waiting points to be extracted increases, so even if the waiting points are extracted based on the position data which may contain errors, indicating the position of the information terminal, it is possible to reduce the possibility that a place that the user can easily reach cannot be extracted.

Furthermore, it is possible to reduce the possibility that the vehicle will be on standby for a long time at the waiting point for the arrival of the user. As a result, it is possible to reduce the risk of obstructing the traffic flow due to vehicles waiting at the waiting point, and to improve the efficiency of the entire vehicle allocation service.

Further, the information processing device and the information processing method, according to the present embodiment, may set an area based on the position data, and may extract the waiting point included in the area, and the area set when the accuracy is low may be wider than the area set when the accuracy is high. As a result, even if the accuracy of the position of the information terminal is low, it is possible to reduce the possibility that a place that the user can easily reach cannot be extracted.

Furthermore, the information processing device and the information processing method, according to the present embodiment, may acquire a plurality of the position data within a predetermined time, and the area may include a plurality of the positions specified by the plurality of the position data. As a result, when the user moves frequently, the waiting point can be extracted from the entire area where the user moves frequently. As a result, it is possible to set a place that the user can easily reach as the waiting point even for a user who moves frequently.

Further, the information processing device and the information processing method, according to the present embodiment, may determine whether the accuracy has been updated, and may reduce the area in a case the accuracy after update is higher than the accuracy before update. As a result, when the accuracy of the user's position changes from low to high (for example, when the user moves from a place with poor communication conditions (such as underground) to a place with good communication conditions (such as above ground)), it is possible to narrow down the number of the waiting points. As a result, it is possible to extract an appropriate waiting point that matches the latest position of the user.

Furthermore, the information processing device and the information processing method, according to the present embodiment, may acquire a position of the vehicle. If the accuracy is lower than a predetermined threshold, the information processing device and the information processing method may calculate a route that the vehicle travels from the position of the vehicle to the waiting point, for each waiting point, may calculate a branch point where the routes diverge from each other, and may set the branch point as a destination of the vehicle. As a result, the vehicle can travel to the user's surrounding area by driving the vehicle to the branch point. As a result, it is possible to reduce the possibility that the vehicle will arrive late at the waiting point where the user is to meet. As a result, user convenience can be improved.

Further, the information processing device and the information processing method, according to the present embodiment, may calculate an arrival time for the vehicle to arrive at the destination, and may transmit the arrival time to the information terminal. Thereby, the user can recognize the arrival time of the vehicle allocated to him/herself. As a result, user convenience can be improved.

Furthermore, the information processing device and the information processing method, according to the present embodiment, may transmit an input request to the information terminal requesting the user to input the position data, if the accuracy is lower than a predetermined threshold. This can reduce the possibility that the number of extracted waiting points will become enormous. As a result, it becomes unnecessary to calculate the route for each waiting point, and the calculation cost can be reduced. Furthermore, the waiting point can be extracted without being affected by the error due to the measurement of the position of the terminal.

Further, an information terminal according to the present embodiment may transmit the position data and the vehicle allocation request to the above-mentioned information processing device, may receive the waiting point from the information processing device, and may present the received waiting point to the user. This allows the user to recognize the waiting point. Furthermore, the user can select a desired waiting point from a plurality of waiting points. As a result, user convenience can be improved.

Respective functions described in the above embodiment may be implemented by one or plural processing circuits. The processing circuits include programmed processors, electrical circuits, etc., as well as devices such as application specific integrated circuits (ASIC) and circuit components arranged to perform the described functions, etc.

Although the contents of the present invention have been described above with reference to the embodiment, the present invention is not limited to these descriptions, and it will be apparent to those skilled in the art that various modifications and improvements can be made. It should not be construed that the present invention is limited to the descriptions and the drawings that constitute a part of the present disclosure. Based on the present disclosure, various alternative embodiments, practical examples, and operating techniques will be apparent to those skilled in the art.

It is needless to mention that the present invention also includes various embodiments that are not described herein. Therefore, the technical scope of the present invention is to be defined only by the invention specifying matters according to the scope of claims appropriately obtained from the above descriptions.

REFERENCE SIGNS LIST 100 terminal
110 communication unit
130 controller
150 sensor
160 display unit
170 operation unit
200 server
210 communication unit
220 database
230 controller
231 accuracy calculation unit
233 allocated vehicle determination unit
235 waiting point extraction unit
237 route calculation unit
239 standby plan setting unit
300 vehicle
400 network

The invention claimed is:

1. An information processing device comprising:
a receiver configured to:
  acquire a position of one or more vehicles,
  acquire position data indicating a position of an information terminal operated by a user, and
  acquire a vehicle allocation request from the information terminal,
a controller configured to:
  determine a vehicle to be allocated to the user based on the vehicle allocation request, the vehicle comprised by the one or more vehicles,
  calculate an accuracy of the position of the information terminal based on the position data,
  extract a plurality of waiting points as candidates for points where the user and the vehicle meet based on the position data and the accuracy of the position,
  determine whether the accuracy is lower than a predetermined threshold, and
  in response to the determination that the accuracy is lower than the predetermined threshold:
    calculate a route that the vehicle travels from the position of the vehicle to each waiting point in the plurality of waiting points;
    calculate a branch point where the routes diverge from each other; and
    set the branch point as a destination of the vehicle, and
a transmitter configured to transmit a command to the vehicle that causes the vehicle to proceed to the destination,
wherein a number of waiting points in the plurality of waiting points extracted by the controller when the accuracy is low is greater than a number of waiting points extracted when the accuracy is high.

2. The information processing device according to claim 1, wherein:
the controller is further configured to:
set an area based on the position data, and
the extracted plurality of waiting points are included in the area, and
the area set when the accuracy is low is larger than the area set when the accuracy is high.

3. The information processing device according to claim 2, wherein:
the receiver is further configured to acquire a plurality of position data within a predetermined time, and
the area includes a plurality of positions specified by the plurality of position data.

4. The information processing device according to claim 2, wherein the controller is further configured to:
determine whether the accuracy has been updated, and
reduce the area in a case the accuracy after update is higher than the accuracy before update.

5. The information processing device according to claim 1, wherein:
the controller is further configured to calculate an arrival time for the vehicle to arrive at the destination,
the transmitter is further configured to transmit the arrival time to the information terminal.

6. The information processing device according to claim 1, wherein:
if the accuracy is lower than another predetermined threshold, the transmitter is further configured to transmit an input request to the information terminal requesting the user to input the position data.

7. An information terminal comprising:
a transmitter configured to:
transmit, to a server:
position data including an error data indicating a positional error of the information terminal or a supplementary data for outputting the error data, and
a vehicle allocation request,
a receiver configured to:
receive, from the server, a plurality of waiting points where each waiting point is a candidate for a point where a vehicle determined based on the vehicle allocation request and the user meet, and
a destination of the vehicle, wherein the destination is a branch point of routes from a position of the vehicle to each waiting point in the plurality of waiting points, the position of the vehicle being determined in response to the transmission of the vehicle allocation request,
a display configured to present the plurality of waiting points and the destination to the user,
wherein a number of waiting points in the plurality of waiting points when an accuracy calculated based on the error data or the supplementary data is low is greater than a number of waiting points displayed when the accuracy is high.

8. An information processing system comprising an information terminal operated by a user and a server, wherein the server comprises:
a receiver configured to:
acquire a position of one or more vehicles,
acquire position data indicating a position of an information terminal operated by a user, and
acquire a vehicle allocation request from the information terminal,
a controller configured to:
determine a vehicle to be allocated to the user based on the vehicle allocation request, the vehicle comprised by the one or more vehicles,
calculate an accuracy of the position of the information terminal based on the position data,
extract a plurality of waiting points as candidates for points where the user and the vehicle meet based on the position data and the accuracy of the position,
determine whether the accuracy is lower than a predetermined threshold, and
in response to the determination that the accuracy is lower than the predetermined threshold:
calculate a route that the vehicle travels from the position of the vehicle to each waiting point in the plurality of waiting points;
calculate a branch point where the routes diverge from each other; and
set the branch point as a destination of the vehicle, and
a transmitter configured to transmit a command to the vehicle that causes the vehicle to proceed to the destination,
wherein a number of waiting points in the plurality of waiting points extracted by the controller when the accuracy is low is greater than a number of waiting points extracted when the accuracy is high.

9. An information processing method comprising:
acquiring a position of one or more vehicles,
acquiring position data indicating a position of an information terminal operated by a user,
acquiring a vehicle allocation request from the information terminal,
determining a vehicle to be allocated to the user based on the vehicle allocation request, the vehicle comprised by the one or more vehicles,
calculating an accuracy of the position of the information terminal based on the position data,
extracting a plurality of waiting points as candidates for points where the user and the vehicle meet based on the position data and the accuracy of the position,
determining whether the accuracy is lower than a predetermined threshold, and
in response to the determination that the accuracy is lower than the predetermined threshold:
calculating a route that the vehicle travels from the position of the vehicle to each waiting point in the plurality of waiting points;
calculating a branch point where the routes diverge from each other; and
setting the branch point as a destination of the vehicle, and
transmitting a command to the vehicle that causes the vehicle to proceed to the destination,
wherein a number of waiting points in the plurality of waiting points extracted when the accuracy is low is greater than a number of waiting points extracted when the accuracy is high.

* * * * *